(12) United States Patent
Lin

(10) Patent No.: US 8,979,107 B2
(45) Date of Patent: Mar. 17, 2015

(54) EASY-PEDALING AND LABOR-SAVING BICYCLE

(71) Applicant: Yong-Song Lin, Kaohsiung (TW)

(72) Inventor: Yong-Song Lin, Kaohsiung (TW)

( * ) Notice: Subject to any disclaimer, the term of this patent is extended or adjusted under 35 U.S.C. 154(b) by 0 days.

(21) Appl. No.: 13/919,099

(22) Filed: Jun. 17, 2013

(65) Prior Publication Data

US 2014/0367940 A1    Dec. 18, 2014

(51) Int. Cl.
*B62M 1/00* (2010.01)
*B62M 1/26* (2013.01)
*B62M 1/28* (2013.01)

(52) U.S. Cl.
CPC .. *B62M 1/26* (2013.01); *B62M 1/28* (2013.01)
USPC ............................ 280/252; 280/253; 280/256

(58) Field of Classification Search
CPC ............. B62M 1/24; B62M 1/26; B62M 1/28
USPC .................... 280/236, 251, 252, 253
See application file for complete search history.

(56) References Cited

U.S. PATENT DOCUMENTS

| 608,674 A | * | 8/1898 | Harshner | 280/257 |
|---|---|---|---|---|
| 1,443,997 A | * | 2/1923 | McLaughlin | 74/143 |
| 2,630,333 A | * | 3/1953 | Petersen | 280/255 |
| 3,039,790 A | * | 6/1962 | Trott | 280/251 |
| 4,227,712 A | * | 10/1980 | Dick | 280/236 |
| 4,561,318 A | * | 12/1985 | Schirrmacher | 74/54 |
| 4,666,173 A | * | 5/1987 | Graham | 280/255 |
| 5,335,927 A | * | 8/1994 | Islas | 280/255 |
| 8,632,089 B1 | * | 1/2014 | Bezerra et al. | 280/252 |
| 2011/0248466 A1 | * | 10/2011 | Leslie | 280/252 |

FOREIGN PATENT DOCUMENTS

GB          581705 A    * 10/1946

* cited by examiner

*Primary Examiner* — Joseph Rocca
*Assistant Examiner* — Daniel Yeagley
(74) *Attorney, Agent, or Firm* — Alan D. Kamrath; Kamrath IP Lawfirm, P.A.

(57) ABSTRACT

An easy-pedaling and labor-saving bicycle includes a frame, a front and a rear wheel set, a transmission set driving the rear wheel set, and a pedal device driving the transmission set. The pedal device includes a crank disposed on the frame, a link-up member driving a rear link-up plate to rotate, a link-up strip disposed between one end of the crank and the link-up member, a pedal unit disposed at the other end of the crank, and a straining member disposed between the frame and the link-up strip. Pedaling the pedal unit makes the crank set as an extension of a moment arm for increasing a force moment imparting to the transmission set. The crank swings downward easily to allow the other end thereof to pull the link-up strip, whereby the link-up member, the transmission set, and the rear wheel are driven to pedal easily, save labor and drive quickly.

9 Claims, 14 Drawing Sheets

EASY-PEDALING AND LABOR-SAVING BICYCLE

BACKGROUND OF THE INVENTION

1. Field of the Invention

The present invention relates to a bicycle and, in particular, to an easy-pedaling and labor-saving bicycle.

2. Description of the Related Art

Referring to FIG. 1, a conventional bicycle 1 comprises a frame 11, a front wheel 12 and a rear wheel respectively pivoted on the frame 11, and a pedal device 14 driving the rear wheel 13. The pedal device 14 includes a front sprocket 141, two supporting arms 142 respectively pivotally disposed on the frame 11 for activating the front sprocket 141, a plurality of pedals 143 respectively connected to the front sprocket 141, a rear sprocket 144 connected to the rear wheel 13 for unidirectionally driving a rotation of the rear wheel 13, and a chain 145 disposed between the front sprocket 141 and the rear sprocket 144. When a user rides the conventional bicycle 1, the pedals 143 are rotated in circumference to allow the front sprocket 141, the chain 145 and the rear sprocket 144 to be sequentially activated for driving a rotation of the rear wheel 13 and giving the bicycle 1 a forward momentum. However, the length of the supporting arms 142 is too short, which limits the generation of the force moment and consumes labor.

SUMMARY OF THE INVENTION

It is an object of the present invention to provide an easy-pedaling and labor-saving bicycle, which saves the active force while pedaling.

The easy-pedaling and labor-saving bicycle in accordance with the present invention comprises a frame, a front wheel set and a rear wheel set respectively disposed on the frame, a transmission set driving the rear gear set, and a pedal device driving the transmission set. The pedal device includes a crank pivoted on the frame, a link-up member activating a rotation of a rear link-up plate, a link-up strip disposed between one end of the crank and the link-up member, a pedal unit disposed at the other end of the crank, and a straining member disposed between the frame and the link-up strip. When a user steps on the pedal unit, the crank is set as an extension of a moment arm for increasing a force moment imparting to the transmission set. The crank swings downward easily to allow the other end of the crank to pull the link-up strip, whereby the link-up strip activates the link-up member. Then, the link-up member drives the transmission set and the rear wheel of the rear wheel set to pedal easily, save labor, and drive quickly.

Preferably, the transmission set includes a front link-up plate pivoted on the frame and a transmitting strip disposed between the front wheel set and the rear wheel set. The front link-up plate is activated by the link-up member. The link-up strip is wound around the link-up member and connected to the straining member.

Preferably, a front unidirectional bearing is disposed between the front link-up plate and the link-up member, whereby the link-up member drives a rotation of the front link-up plate in single direction.

Preferably, the link-up member includes a swinging rod pivoted on the frame and respective stretching rods telescopically disposed at two ends of the swinging rod. The link-up strip has a first link-up strip disposed between the active part and one of the stretching rods and a second link-up strip disposed on the other stretching rod for being wound around the rear link-up plate, and connected to the straining member.

Preferably, a swinging arm is pivotally disposed between the frame and the pedal unit. The active part is formed by a plurality of telescoping rods.

Preferably, an elastic member is disposed between the crank and the frame for driving the crank to return via the elastic member.

Preferably, an extension set is connected between the link-up member and the rear link-up plate. The extension set includes a first rotating member and a second rotating member respectively pivoted on the frame, and a plurality of connecting strips connected to the first rotating member and the second rotating member. The connecting strips are respectively disposed between one end of the link-up member and one end of the second rotating member and between the other end of the second rotating member and one end of the first rotating member. The second link-up strip is disposed at the other end of the first rotating member.

Preferably, two pedal devices and two transmission sets are respectively and correspondingly disposed on two sides of the frame.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
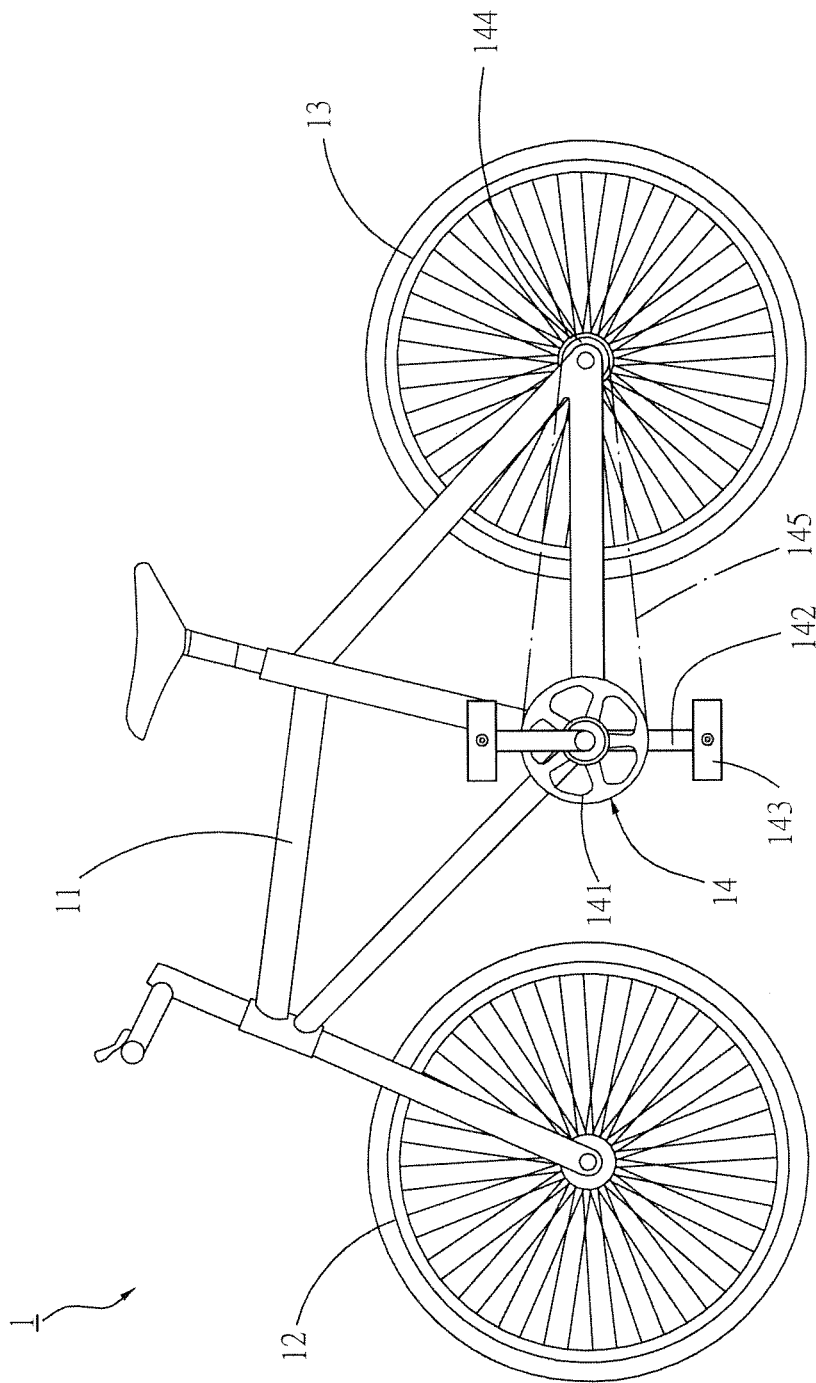
FIG. 1 is a schematic view showing a conventional bicycle.

Before describing in detail, it should be noted that the like elements are denoted by the similar reference numerals throughout the disclosure.

Figure 2:
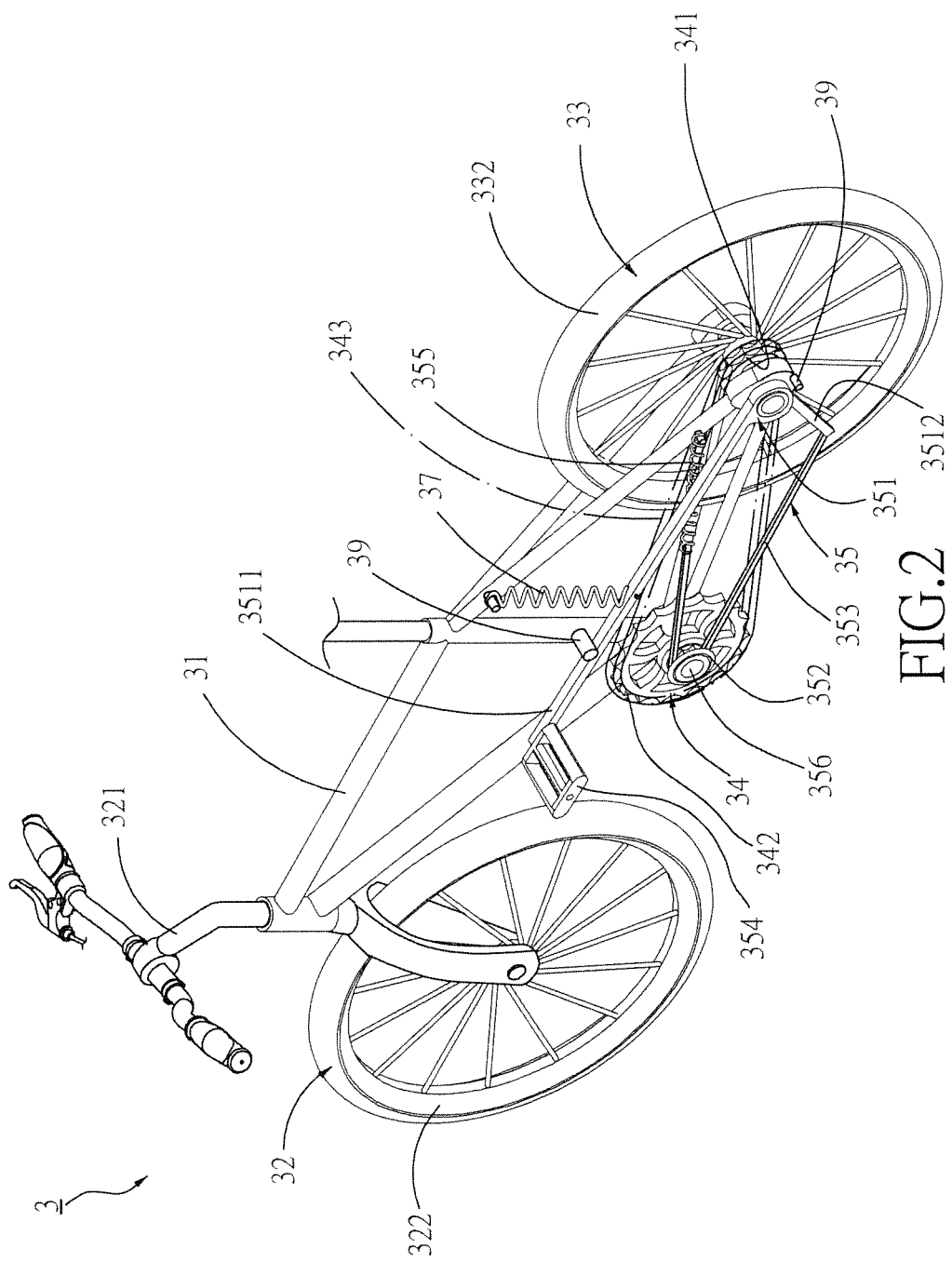
FIG. 2 is a schematic view showing a first preferred embodiment of the present invention.
Figure 3:
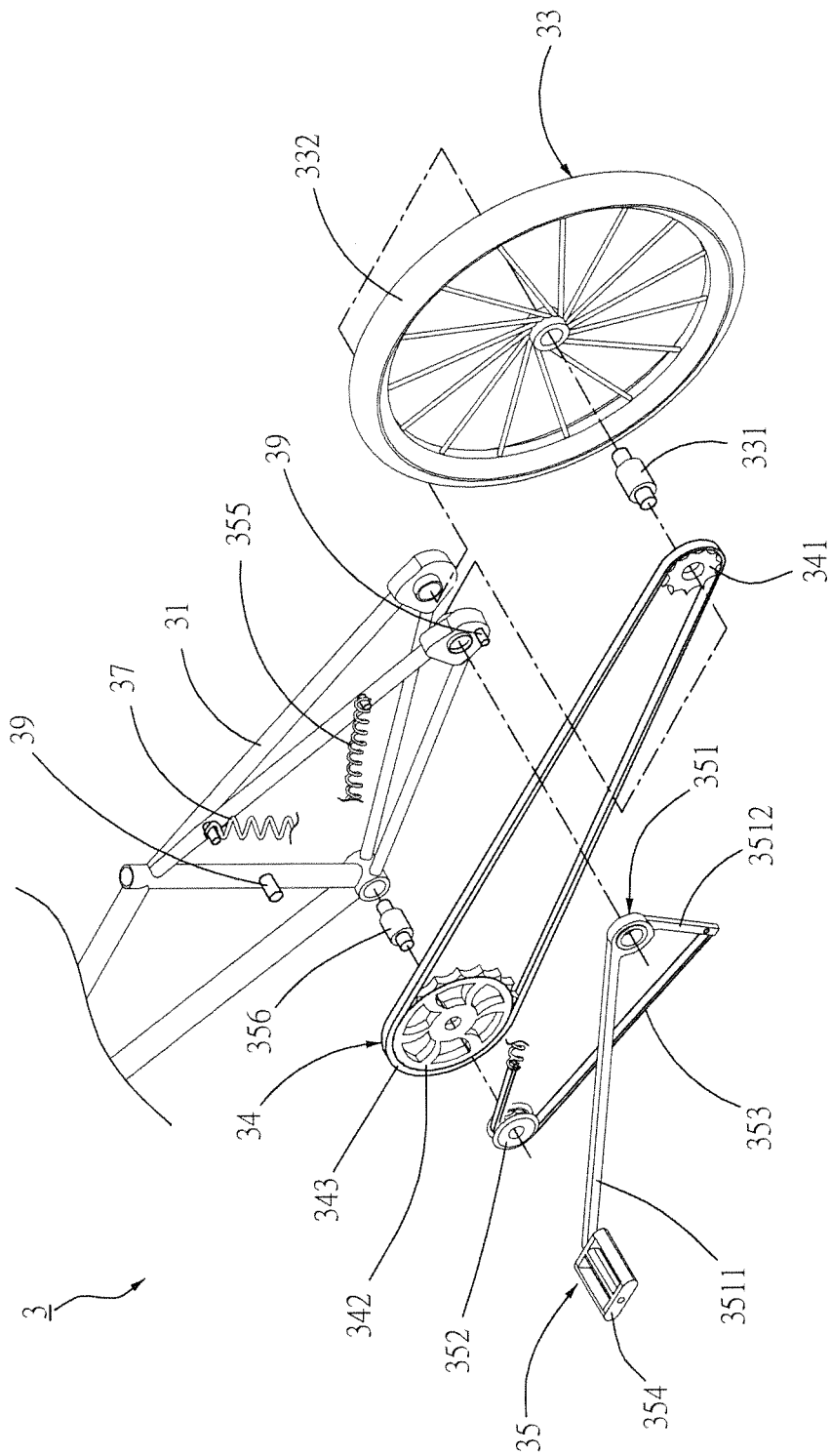
FIG. 3 is an exploded view showing the first preferred embodiment of the present invention.
Figure 4:
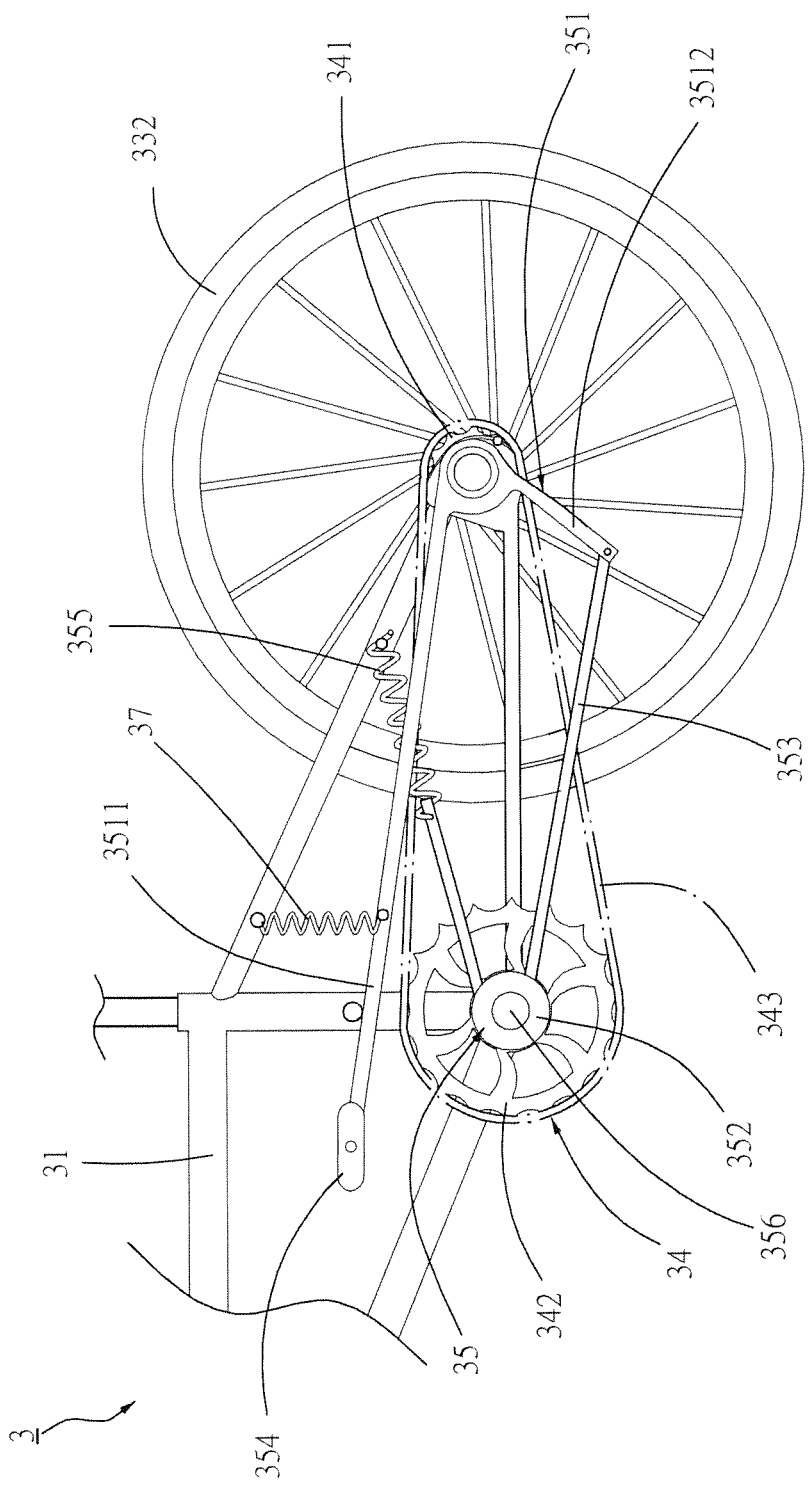
FIG. 4 is a plan view showing the first preferred embodiment of the present invention.

Referring to FIGS. 2, 3, and 4, a first preferred embodiment of the present invention is shown. An easy-pedaling and labor-saving bicycle 3 comprises a frame 31, a front wheel set 32 and a rear wheel set 33 respectively disposed on the frame 31, a transmission set 34 driving the rear wheel set 33, and a pedal device 35 driving the transmission set 34. The front wheel set 32 includes a handlebar frame 321 pivoted to one end of the frame 31 and a front wheel 322 disposed at one end of the handlebar frame 321. The rear wheel set 33 includes a rear unidirectional bearing 331 pivoted to the other end of the frame 31 and a rear wheel 332 disposed on the rear unidirectional bearing 331 and unidirectionally driven by the rear unidirectional bearing 331. In this preferred embodiment, the transmission set 34 includes a rear link-up plate 341 activating a rotation of the rear unidirectional bearing 331, a front link-up plate 342 pivoted on the frame 31, and a transmitting strip 343 disposed between the front link-up plate 342 and the rear link-up plate 341.

Furthermore, the pedal device 35 includes a crank 351 pivoted on the frame 31, a link-up member 352 activating a rotation of the front link-up plate 342, a link-up strip 353 disposed between one end of the crank 351 and the link-up member 352, a pedal unit 354 disposed at the other end of the crank 351, and a straining member 355 provided with elasticity and disposed between the frame 31 and the link-up strip 353. The crank 351 has an active part 3511 stretching out from a pivot point for being connected to the pedal unit 354 and a link-up part 3512 stretching out from the pivot point for being connected to the link-up strip 353. To allow the link-up member 352 to drive the rotation of the front link-up plate 342 unidirectionally, the first preferred embodiment, preferably, further includes a front unidirectional bearing 356 or a general bearing disposed between the front link-up plate 342 and the link-up member 352. Herein, a front unidirectional bearing 356 disposed between the front link-up plate 342 and the link-up member 352 is adopted. To return the crank 351 back to its position easily after pedaling, an elastic member 37 is preferably disposed between the crank 351 and the frame 31 for driving the crank 351 to return via the elastic member 37. Moreover, when the crank 351 swings upward and downward, a block 39 can preferably protrude outward from the frame 31 for restricting a swinging scope of the crank 351. The straining member 355 can be a flexible member, such as a spring and others, and herein the spring is illustrated as an example. The link-up strip 353 is wound around the link-up member 352 for being connected to the straining member 355. The pedal devices 35 and the transmission sets 34 are respectively and symmetrically disposed on two sides of the frame 31. Only one side of the frame is briefly shown in the figures for an easy understanding.

Figure 5:
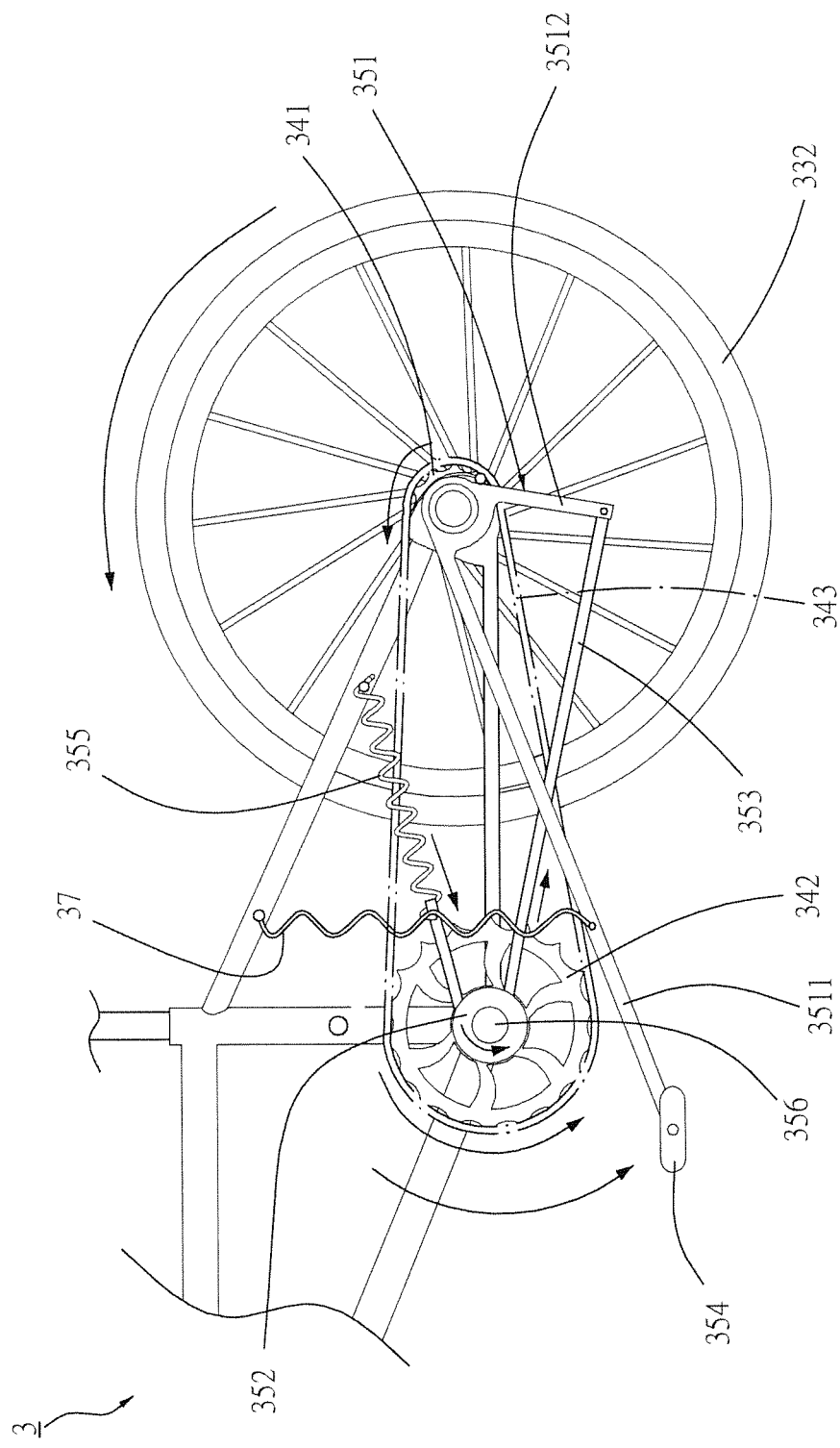
FIG. 5 is a schematic view showing the first preferred embodiment of the present invention in use.
Figure 6:
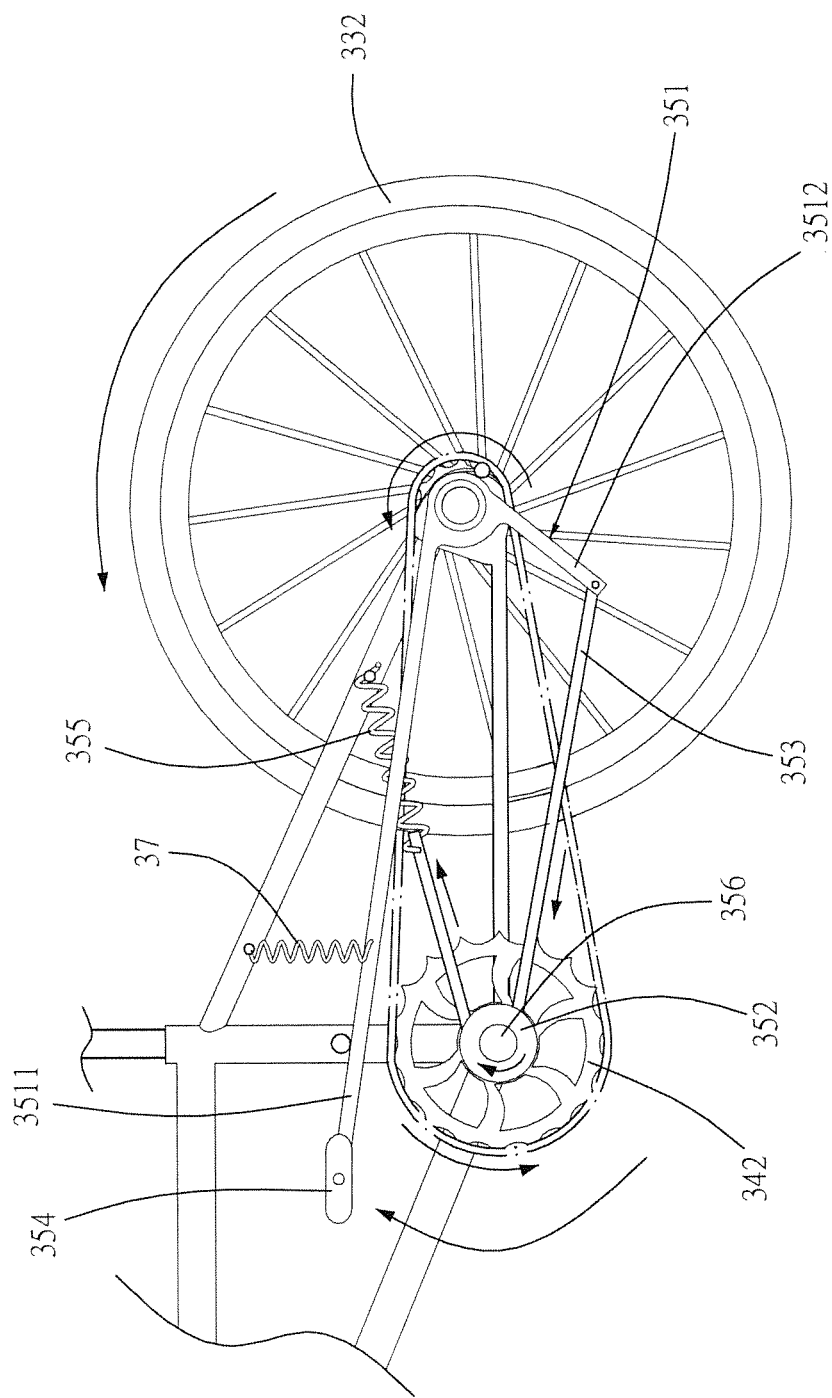
FIG. 6 is a schematic view showing the first preferred embodiment of the present invention in use.

Referring to FIGS. 3 and 5, a user sits on the bicycle 3 and steps on the pedal unit 354 to apply a downward force thereon, which allows a pivot point of the active part 3511 and the crank 351 to be set as an active moment arm. Therefore, the user can drive the rotation of the crank 351 and allow the link-up part 3512 to pull the link-up strip 353 without spending lots of pedaling forces. During the pulling of the link-up strip 353, the link-up strip 353 drives the link-up member 352 to rotate synchronically, whereby the link-up member 352 is allowed to activate the rotation of the front link-up plate 342. The front link-up plate 342 then drives the rear link-up plate 341 via the transmitting strip 343 and activates the rotation of the rear wheel 332 to propel the bicycle 3 forward. Referring to FIG. 6, while the user lifts a leg stepped on the pedal unit 354, the elastic member 37 drives the crank 351 to return, and the link-up strip 353 is reversely pulled by the straining member 355, so that the link-up member 352 rotates to the other direction. By the front unidirectional bearing 356, the link-up member 352 does not activate the front link-up plate 342 while rotating toward the other direction. Further, the front link-up plate 342 can still rotate forward due to an inertia force and activate the onward movement of the rear wheel 332. Therefore, it is easy to activate the rotation of the rear wheel 332 by repeatedly pedaling.

Figure 7:
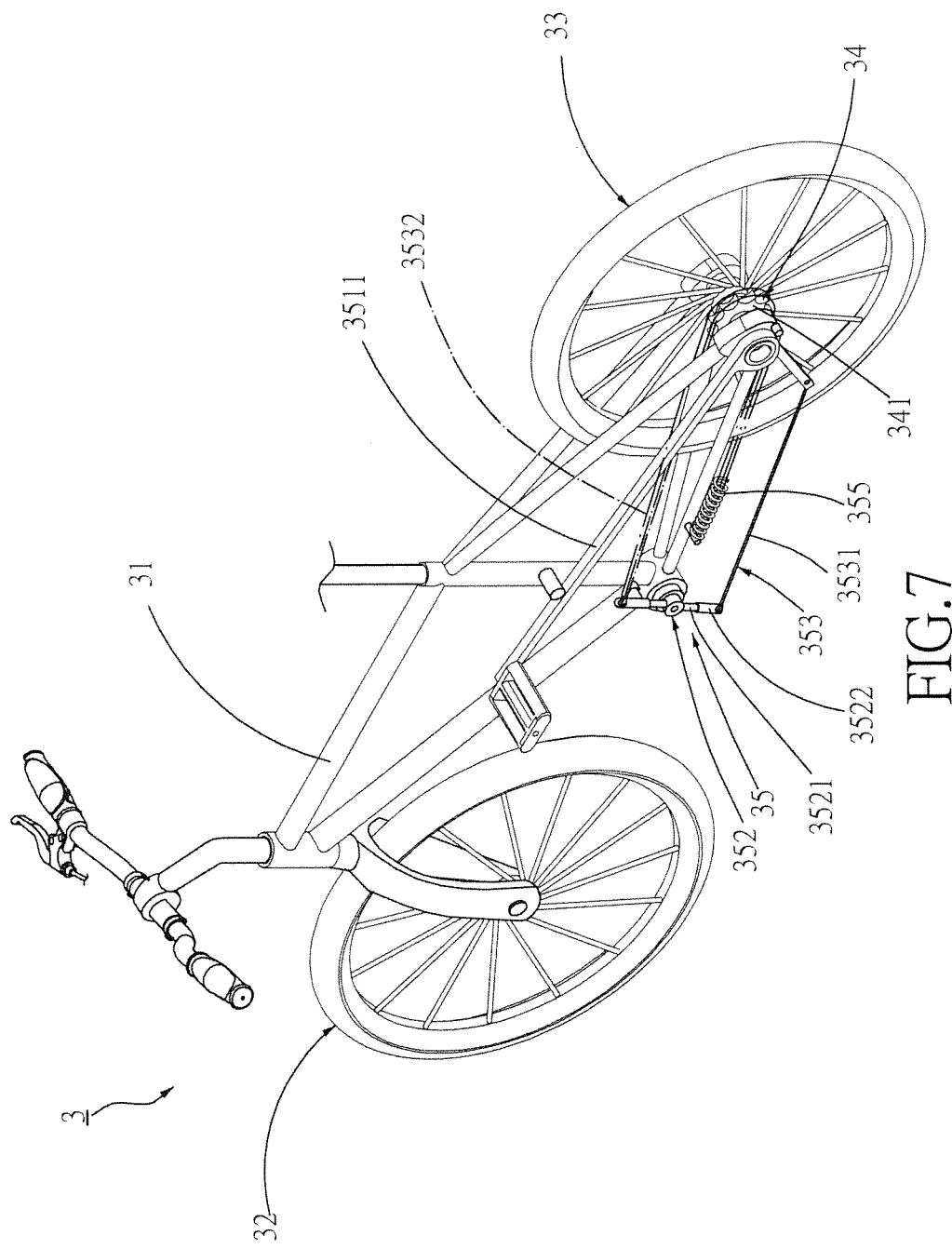
FIG. 7 is a schematic view showing a second preferred embodiment of the present invention.

Referring to FIG. 7, a second preferred embodiment of the present invention is shown. The bicycle 3 still comprises the frame 31, the front wheel set 32, the rear wheel set 33, the transmission set 34, and the pedal device 35, which have the same effects as the first preferred embodiment and herein are omitted. In the second preferred embodiment of the present invention, the link-up member 352 includes a swinging rod 3521 pivoted on the frame 31 and respective stretching rods 3522 telescopically disposed at two ends of the swinging rod 3521. The link-up strip 353 includes a first link-up strip 3531 disposed between the active part 3511 and one of the stretching rods 3522 and a second link-up strip 3532 disposed on the other stretching rod 3522 and wound around the rear link-up plate 341 for being connected to the straining member 355.

Figure 8:
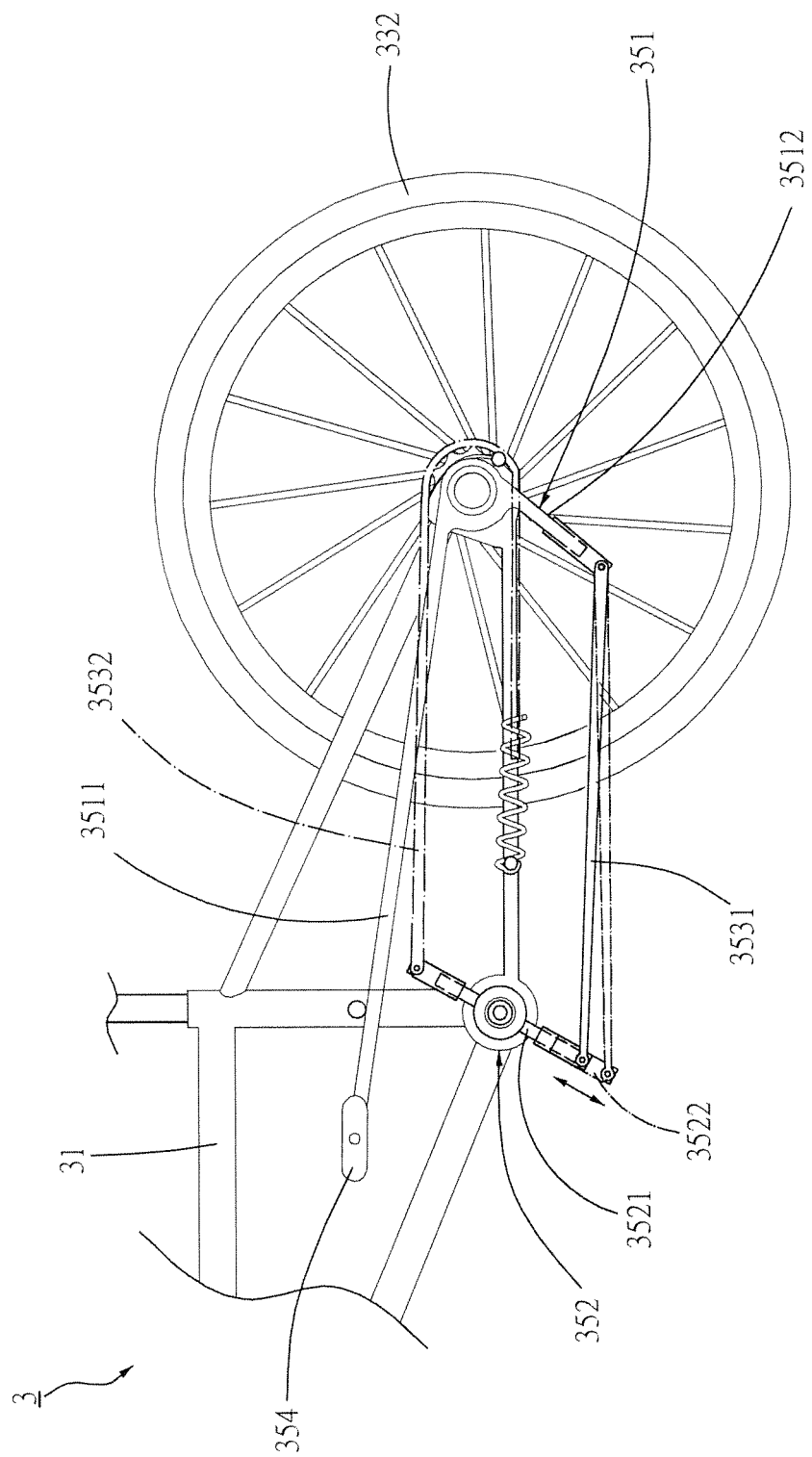
FIG. 8 is a plan view showing the second preferred embodiment of the present invention.
Figure 9:
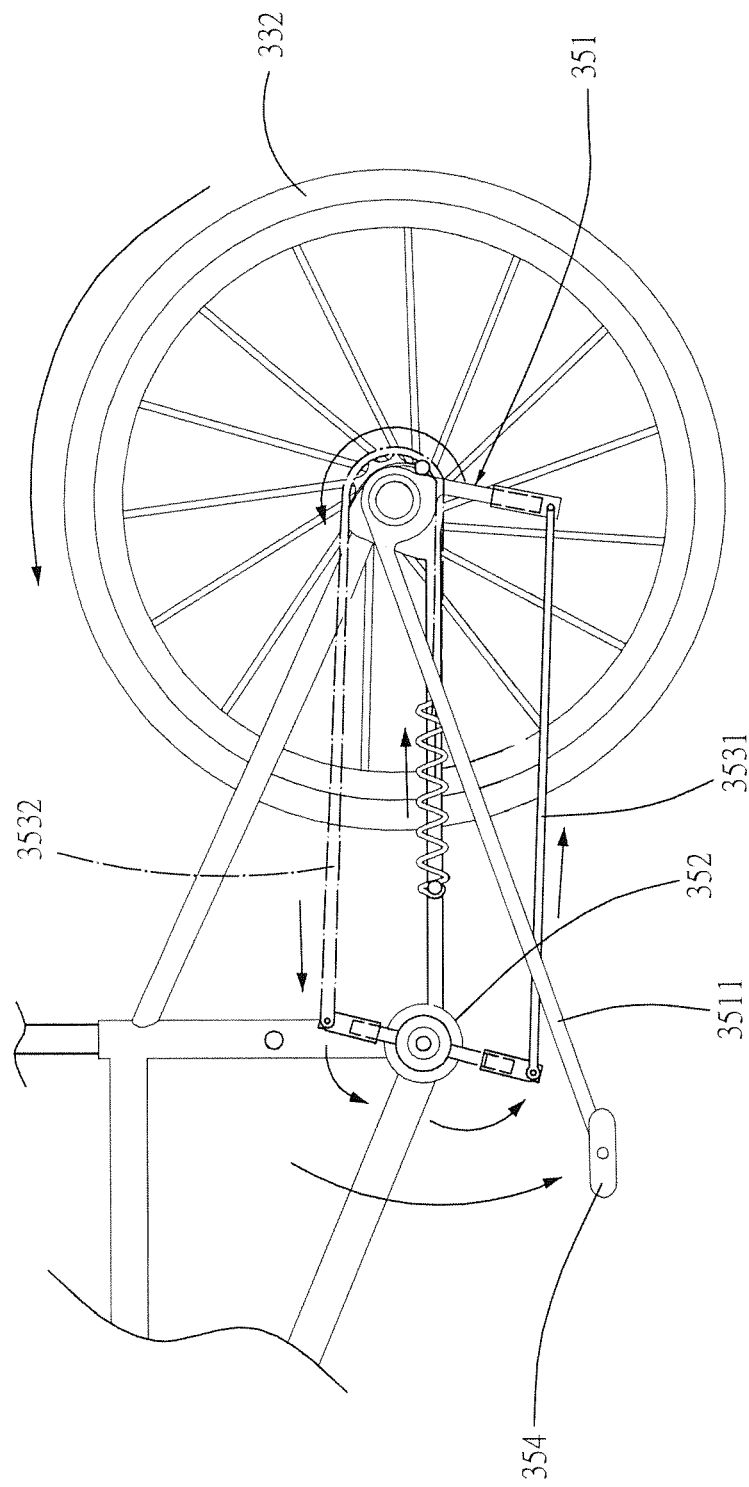
FIG. 9 is a schematic view showing the second preferred embodiment of the present invention in use.

Referring to FIG. 8, by making use of the stretching rods 3522 capable of being telescoped on the swinging rod 3521, a distance between the stretching rods 3522 and the swinging rod 3521 is adjustable, thereby adjusting the length of the moment arm. Referring to FIG. 9, when a downward force is imparted to the pedal unit 354, a pivot point of the active part 3511 and the crank 351 is set as an active moment arm. The crank 351 and the link-up part 3512 are stretchable for an adjustment, thereby adjusting the moment arm length of the active part 3511. Therefore, the user does not have to spend too much pedaling force to drive the crank 351 to rotate, so that the first link-up strip 3531 activates the rotation of the link-up member 352. Thus, the second link-up strip 3532 and the rear wheel 332 are driven to rotate by the rotation of the link-up member 352 for driving the bicycle 3 to move forward.

Figure 10:
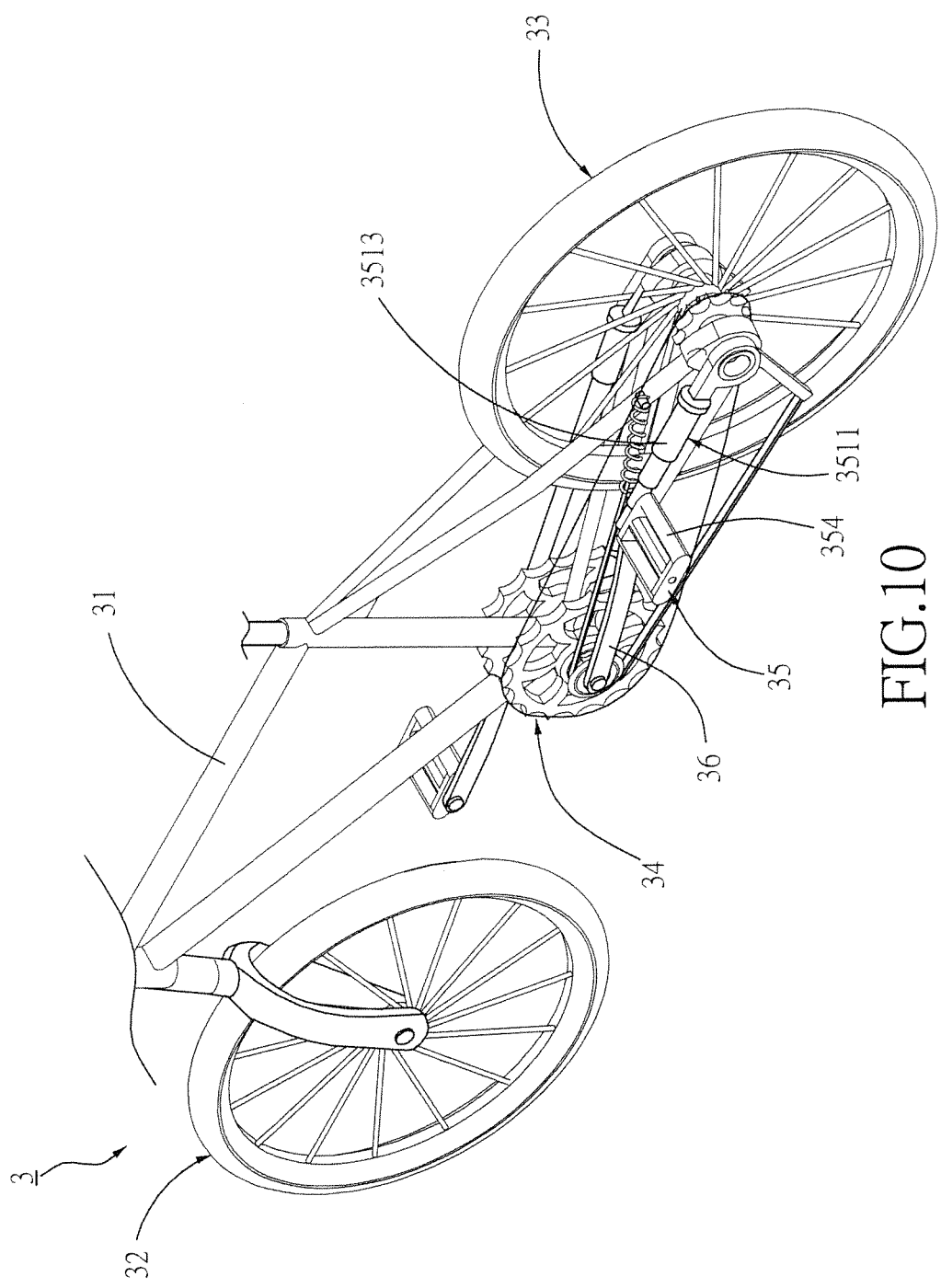
FIG. 10 is a schematic view showing a third preferred embodiment of the present invention.
Figure 11:
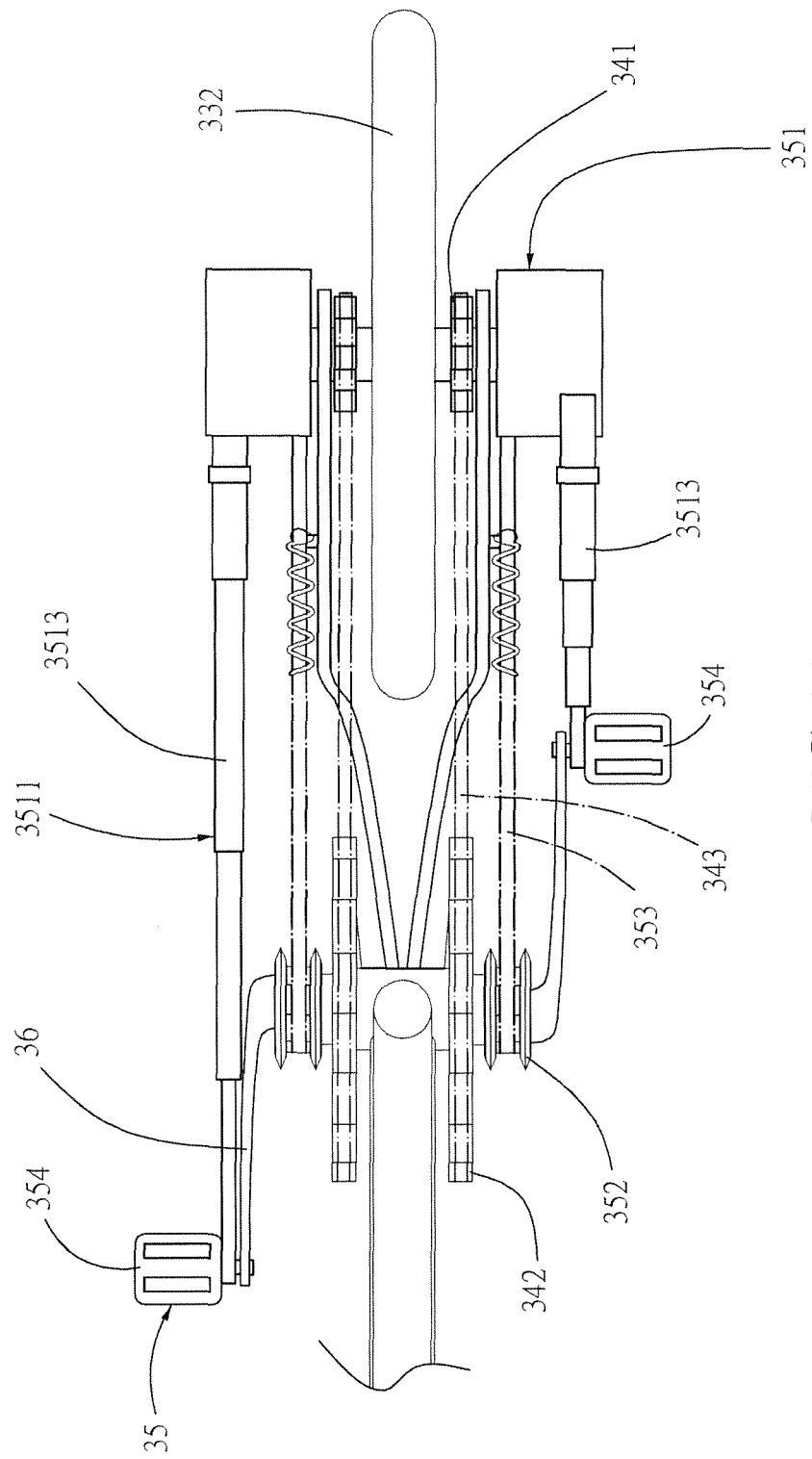
FIG. 11 is a plan view showing the third preferred embodiment of the present invention.

Referring to FIGS. 10 and 11, a third preferred embodiment of the present invention is shown. The bicycle 3 still comprises the frame 31, the front wheel set 32, the rear wheel set 33, the transmission set 34, and the pedal device 35, which have the same effects as the first preferred embodiment and herein are omitted. In the third preferred embodiment of the present invention, a swinging arm 36 is preferably pivotally disposed between the frame 31 and the pedal unit 354 in order that the pedal unit 354 rotates in circumference while pedaling. The active part 3511 is formed by a plurality of telescoping rods 3513. In the third preferred embodiment, two pedal devices 35 are disposed on the bicycle 3.

Referring to FIG. 11, the user steps on the pedal unit 354 and applies a downward force in use. The pedal unit 354, which is restricted by the swinging arm 36, can only rotate in circumference for activating the rotation of the link-up strip 353, the link-up member 352, the front link-up plate 342, the transmitting strip 343, the rear link-up plate 341, and the rear wheel 332, so that an onward force is generated to drive the bicycle 3 to move forward. When the user applies a downward force on the pedal unit 354, a distance between the pivot points of the pedal unit 354 and the crank 351 is increased, so that the telescoping rods 3513 is able to be pulled and stretched. When the pedal unit 354 is lifted backward, the distance between the pivot points of the pedal unit 354 and the crank 351 is decreased, so that the telescoping rods 3513 is able to be shortened. Therefore, the bicycle 3 swings in circumference when being activated in order to allow the user to be familiar with the bicycle 3 easily.

Figure 12:
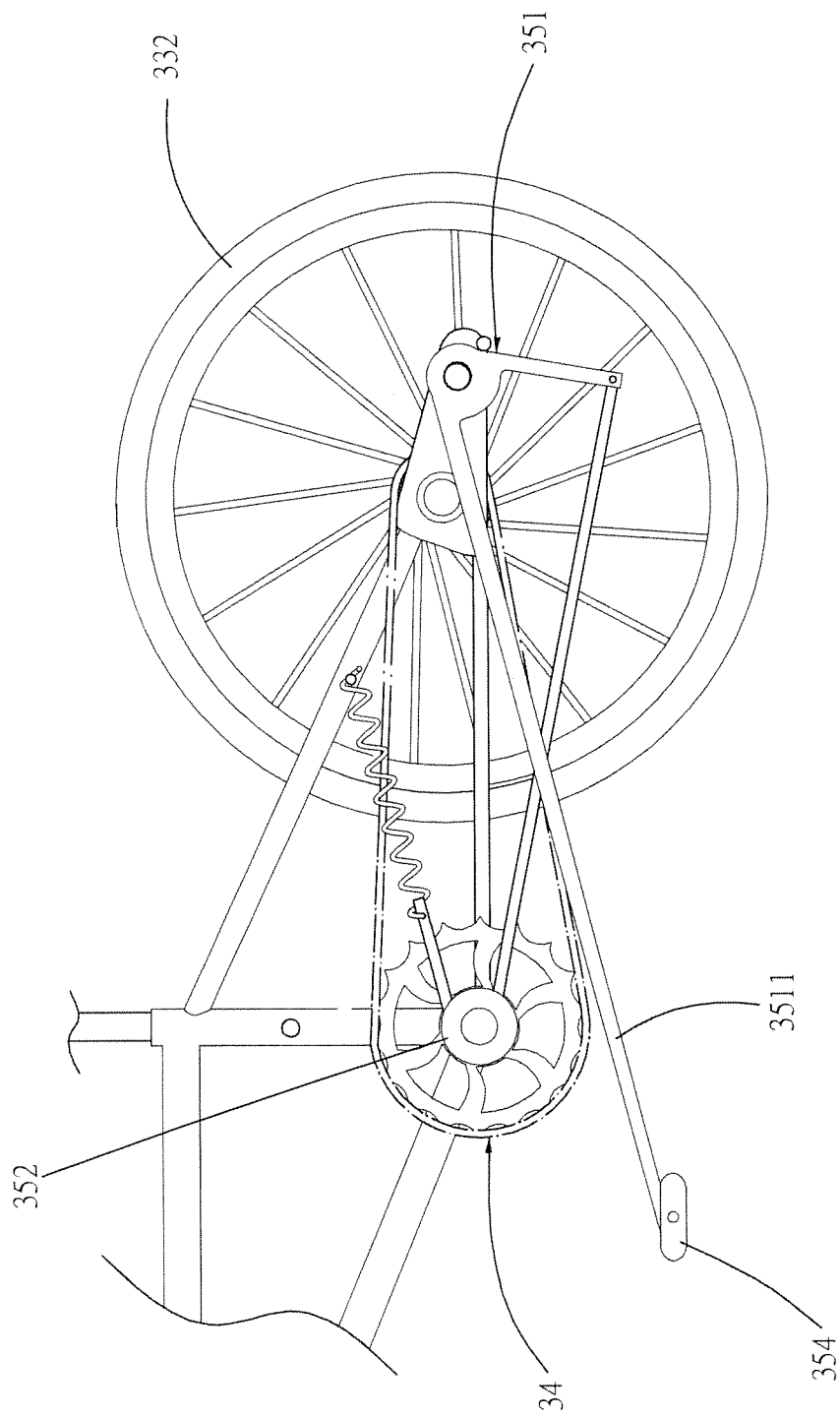
FIG. 12 is a schematic view showing a fourth preferred embodiment of the present invention.

Referring to FIG. 12, a fourth preferred embodiment of the present invention is shown. The main components thereof have the same effects as the first preferred embodiment and herein are omitted. In the fourth preferred embodiment of the present invention, a pivotal position of the crank 351 is preferably disposed in a further distance from the pedal unit 354, so that the active part 3511 of the crank 351 is able to be stretched further to allow the crank 351 to swing downward easily. Thus, the transmission of the link-up member 352, the transmission set 34 and the rear wheel 332 are easily activated to save labor efficiently.

Figure 13:
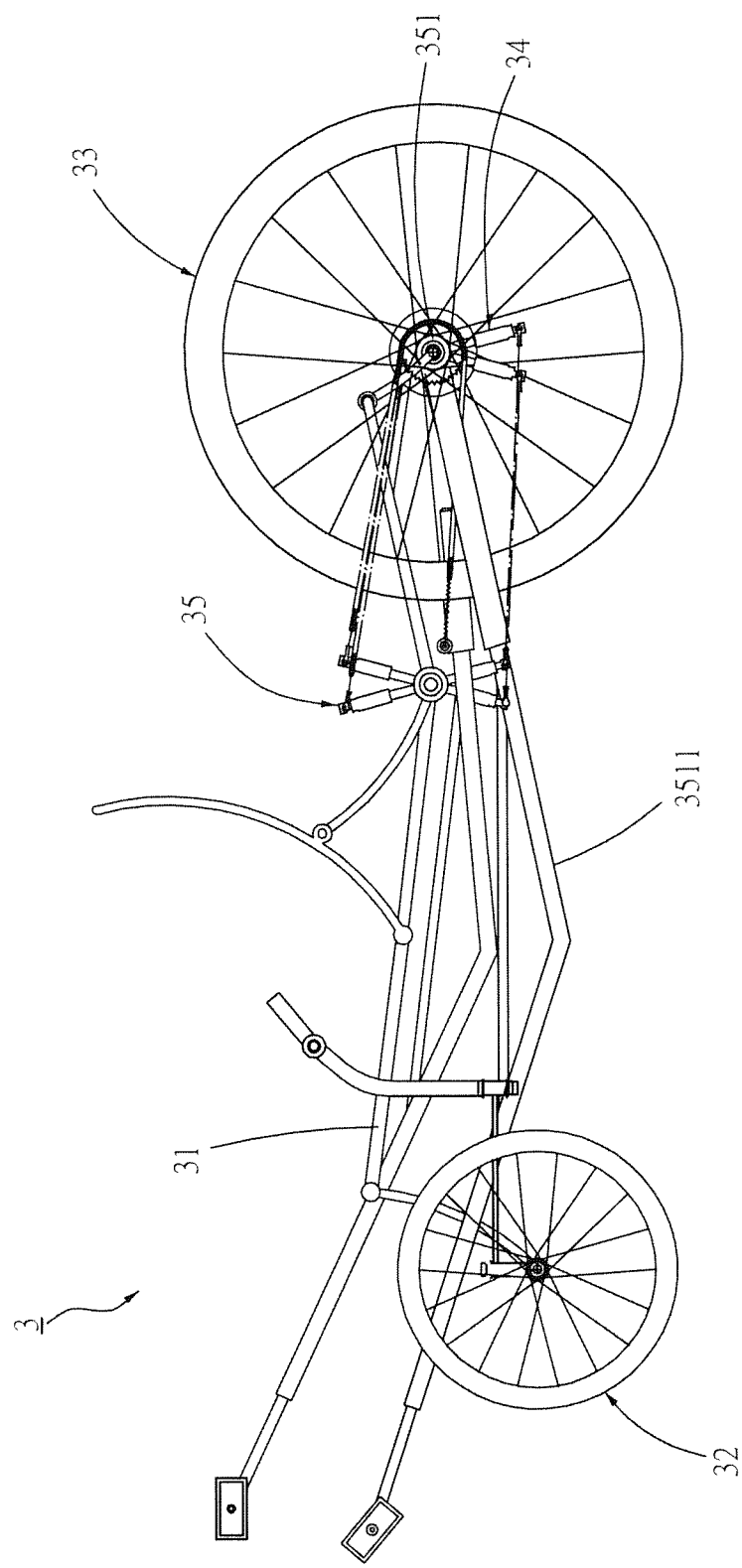
FIG. 13 is a schematic view showing a fifth preferred embodiment of the present invention.

Referring to FIG. 13, a fifth preferred embodiment of the present invention is shown. The bicycle 3 still comprises the frame 31, the front wheel set 32, the rear wheel set 33, the transmission set 34, and the pedal device 35, which have the same effects as the first preferred embodiment and herein are omitted. In the fifth preferred embodiment of the present invention, the frame 31 is preferably defined recumbent, which not only changes the pedaling pose but also increases the variety in using. Furthermore, the active part 3511 of the crank 351 is preferably stretched for saving labor when pedaling.

Figure 14:
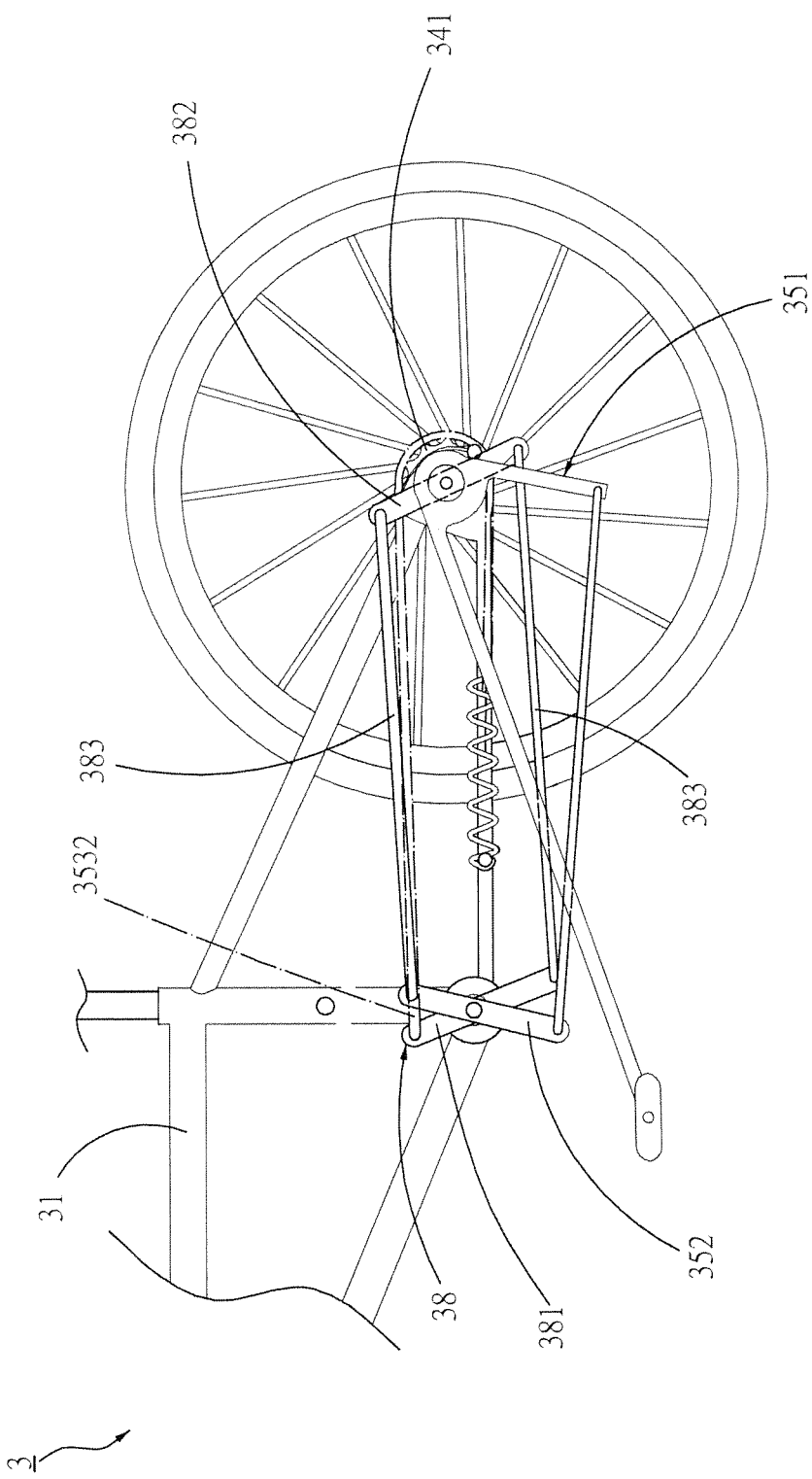
FIG. 14 is a schematic view showing a sixth preferred embodiment of the present invention.

Referring to FIG. 14, a sixth preferred embodiment of the present invention is shown. The main components thereof have the same effects as the second preferred embodiment and herein are omitted. In the sixth preferred embodiment of the present invention, an extension set 38 is connected between the link-up member 352 and the rear link-up plate 341 during the transmission. The extension set 38 includes a first rotating member 381 and a second rotating member 382 respectively pivoted on the frame 31, and a plurality of connecting strips 383 connected to the first rotating member 381 and the second rotating member 382. The connecting strips 383 are respectively disposed between one end of the link-up member 352 and one end of the second rotating member 382 and between the other end of the second rotating member 382 and one end of the first rotating member 381. The second link-up strip 3532 is disposed at the other end of the first rotating member 381. The extension set 38 is preferably disposed, so that the crank 351, the link-up member 352, the first rotating member 381, and the second rotating member 382 can be set as supports of the moment arm in order to extend the length of the moment arm. Moreover, a force moment applied on the transmission set 34 is increased to save labor and pedal easily.

To sum up, the easy-pedaling and labor-saving bicycle comprises a crank disposed on the frame, a link-up member activating a rotation of the rear link-up plate, a link-up strip disposed between one end of the crank and the link-up member, a pedal unit disposed at the other end of the crank, and a straining member disposed between the frame and the link-up strip. When the user steps on the pedal unit, the crank is set as an extension of the moment arm for increasing a force moment applied on the transmission set. Therefore, the crank is driven to swing downward for the other end of the crank being able to pull and drive a rotation of the link-up strip, whereby the transmission of the link-up member, the transmission set, and the rear wheel of the rear wheel set are activated and driven to pedal easily, save labor, and drive speedily.

While the embodiments in accordance with the present invention have been shown and described, it should be clear to those skilled in the art that further embodiments may be made without departing from the scope of the present invention.

I claim:

1. An easy-pedaling and labor-saving bicycle comprising:
    a frame;
    a front wheel set including a handlebar frame pivoted to one end of said frame and a front wheel disposed at one end of said handlebar frame;
    a rear wheel set including a rear unidirectional bearing pivoted to another end of said frame and a rear wheel disposed on said rear unidirectional bearing and unidirectionally driven by said rear unidirectional bearing;
    a pedal device including a crank pivoted on said frame at a pivot point coaxial or substantially adjacent said rear wheel set, a link-up member pivoted on said frame, a link-up strip disposed between one end of said crank and said link-up member, and a pedal unit disposed at another end of said crank; with said crank having an active part extended out from said pivot point and connected to said pedal unit, a link-up part extended out from said pivot point for being connected to said link-up strip, and a straining member disposed between said frame and said link-up strip; and
    a transmission set including a rear link-up plate activating a rotation of said rear unidirectional bearing; with said rear link-up plate activated by said link-up member, wherein said transmission set includes a front link-up plate pivoted on said frame and a transmitting strip disposed between said front wheel set and said rear wheel set; with said front link-up plate activated by said link-up member; and with said link-up strip wound around said link-up member and connected to said straining member.

2. The easy-pedaling and labor-saving bicycle as claimed in claim 1, wherein a front unidirectional bearing is disposed between said front link-up plate and said link-up member, whereby said link-up member drives a rotation of said front link-up plate in a single direction.

3. The easy-pedaling and labor-saving bicycle as claimed in claim 2, wherein a swinging arm is pivotally disposed between said frame and said pedal unit; with said active part formed by a plurality of telescoping rods.

4. The easy-pedaling and labor-saving bicycle as claimed in claim 2, wherein an elastic member is disposed between said crank and said frame for driving said crank to return via said elastic member.

5. The easy-pedaling and labor-saving bicycle as claimed in claim 2, wherein two pedal devices and two transmission sets are respectively and correspondingly disposed on two sides of said frame.

6. The easy-pedaling and labor-saving bicycle as claimed in claim 1, wherein a swinging arm is pivotally disposed between said frame and said pedal unit; with said active part formed by a plurality of telescoping rods.

7. The easy-pedaling and labor-saving bicycle as claimed in claim 2, wherein an elastic member is disposed between said crank and said frame for driving said crank to return via said elastic member.

8. The easy-pedaling and labor-saving bicycle as claimed in claim 1, wherein two pedal devices and two transmission sets are respectively and correspondingly disposed on two sides of said frame.

9. An easy-pedaling and labor-saving bicycle comprising:
    a frame;
    a front wheel set including a handlebar frame pivoted to one end of said frame and a front wheel disposed at one end of said handlebar frame;
    a rear wheel set including a rear unidirectional bearing pivoted to another end of said frame and a rear wheel disposed on said rear unidirectional bearing and unidirectionally driven by said rear unidirectional bearing;
    a pedal device including a crank pivoted on said frame, a link-up member pivoted on said frame, a first link-up strip disposed between one end of said crank and said link-up member, and a pedal unit disposed at another end of said crank; with said crank having an active part extended out from a pivot point and connected to said pedal unit, a link-up part extended out from said pivot point for being connected to said first link-up strip, and a straining member disposed between said frame and said first link-up strip; and a transmission set including a rear link-up plate activating a rotation of said rear unidirectional bearing; with said rear link-up plate activated by said link-up member, wherein an extension set is connected between said link-up member and said rear link-up plate; with said extension set including a first rotating member and a second rotating member respectively pivoted on said frame, and first and second connecting strips connected to said first rotating member and said second rotating member; with said first connecting strip disposed between one end of said link-up member and one end of said second rotating member and with the second connecting strip disposed between another end of said second rotating member and one end of said first rotating member; with a second link-up strip disposed at another end of said first rotating member and wound around said rear link-up plate and connected to the straining member.

* * * * *